United States Patent
Cline

(10) Patent No.: US 7,739,222 B2
(45) Date of Patent: *Jun. 15, 2010

(54) BINARY TREES FOR DETECTING INVENTORY PROBLEMS IN AN ENTERPRISE MODEL

(75) Inventor: Kevin Cline, Dallas, TX (US)

(73) Assignee: i2 Technologies US, Inc., Dallas, TX (US)

( * ) Notice: Subject to any disclaimer, the term of this patent is extended or adjusted under 35 U.S.C. 154(b) by 1333 days.

This patent is subject to a terminal disclaimer.

(21) Appl. No.: 11/174,931

(22) Filed: Jul. 5, 2005

(65) Prior Publication Data

US 2006/0041526 A1 Feb. 23, 2006

Related U.S. Application Data

(62) Division of application No. 09/397,818, filed on Sep. 17, 1999, now Pat. No. 6,944,598.

(51) Int. Cl.
*G06F 17/00* (2006.01)
*G06Q 10/00* (2006.01)
(52) U.S. Cl. .......................... 707/100; 707/101; 705/28
(58) Field of Classification Search ........................ None
See application file for complete search history.

(56) References Cited

U.S. PATENT DOCUMENTS 4,972,504 A  11/1990  Daniel, Jr. et al.
5,418,947 A * 5/1995  Hsu et al. ...................... 707/1
5,434,775 A    7/1995  Sims et al.
6,044,361 A * 3/2000  Kalagnanam et al. ......... 705/28
6,151,582 A * 11/2000 Huang et al. ................... 705/8
6,266,655 B1  7/2001  Kalyan
6,307,848 B1  10/2001 Wood, Jr.
6,321,230 B1  11/2001 Joslin et al.
6,338,053 B2  1/2002  Uehara et al.

FOREIGN PATENT DOCUMENTS

JP          11203372          7/1999

OTHER PUBLICATIONS

K. Torp, L. Mark, C.S. Jensen, "Efficient Differential Timeslice Computation," XP-002180927, IEEE Transactions on Knowledge and Data Engineering, vol. 10, No. 4, 13 pages.
Notification of Transmittal of the International Search Report or the Declaration, dated May 11, 2001.

* cited by examiner

*Primary Examiner*—F. Ryan Zeender
*Assistant Examiner*—Mussa Shaawat
(74) *Attorney, Agent, or Firm*—Booth Udall, PLC; Steven J. Laureanti

(57) ABSTRACT

A binary tree structure for detecting inventory problems. A first embodiment detects on-hand inventory problems. A second embodiment detects inventory requirements problems. Both embodiments use a binary tree whose nodes store time values and delta values. (FIG. 2). The delta values represent inventory consumers or producers. (FIG. 6). The time values of trees used for inventory requirements problems are shifted in accordance with build-ahead times. (FIG. 6).

12 Claims, 3 Drawing Sheets

| DAY | 1 | 2 | 3 | 4 | 5 | 6 | 7 | 8 | 9 |
|---|---|---|---|---|---|---|---|---|---|
| PRODUCERS | | | 6 | | | | | 10 | |
| CONSUMERS | | | | | | -5 | | | -7 |
| ON-HAND | 0 | 0 | 6 | 6 | 6 | 1 | 1 | 11 | 4 |
| SHIFTED CONSUMERS | | -5 | | | -7 | | | | |
| MIN-TIME FUNCTION VALUE | 0 | -5 | 1 | 1 | -6 | -6 | -6 | 4 | 4 |
| | | ↑ | | | ↑ | ↑ | ↑ | | |

BINARY TREES FOR DETECTING INVENTORY PROBLEMS IN AN ENTERPRISE MODEL

CROSS-REFERENCES TO RELATED APPLICATIONS

This is a divisional application of U.S. patent application Ser. No. 09/397,818 filed on 17 Sep. 1999, now U.S. Pat. No. 6,944,598, the entire contents of which are hereby incorporated by reference.

TECHNICAL FIELD OF THE INVENTION

This invention relates to computer data structures and algorithms, and more particularly to a binary tree data structure for representing a time-varying function and to algorithms that use the data structure, for applications related to inventory management.

BACKGROUND

As applications for computer software get increasingly complex and sophisticated, so does the need for efficiency in performance of the software. An example of complex software is the "enterprise" software being used to model the operation of businesses, such as manufacturers or service providers. The enterprise model often includes time-varying quantities, such as inventory.

Enterprise software typically permits the user to enter queries about time-varying quantities. Sometimes the query might be a simple "function value" type of query, such as, "How many on hand at time t?". However, a more practical "find" type of query asks for earliest/latest or maximum/minimum information. For example, a query seeking both "earliest" time and "minimum" amount information might ask, "Find the earliest time greater than t at which we will have a minimum of n units of material on hand?".

One approach to solving queries involving time-varying variables is to represent values of the variable with a "binary tree". A binary tree is a type of data structure known in the art of algorithms, which arranges data hierarchically. The tree may be queried to obtain data about the variable.

One available enterprise model, at one time manufactured by Optimax Corporation under the trademark OPTIFLEX, used a binary tree to represent a time varying function. At each node, certain values relative to the "subtree" of that node were stored.

SUMMARY OF THE INVENTION

One aspect of the invention is a computer-readable medium for storing programming operable to provide on-hand inventory data. Specifically, the software performs an inventory query method that accesses data stored in a binary tree.

To create the binary tree, the inventory is represented in terms of a function that is a series of time value and function value pairs. From this function, a balanced binary tree is created. Each node of the tree has an associated time value and delta value representing a change in value of the function. Each node stores a producer delta or a consumer delta, with each producer delta having a positive value and each consumer delta having a negative value.

The method involves accessing the tree in response to a query, and using delta values obtained during the accessing step to determine at least one function value that represents inventory quantity at a certain time.

DETAILED DESCRIPTION

Binary Tree with Delta Nodes

Figure 1:
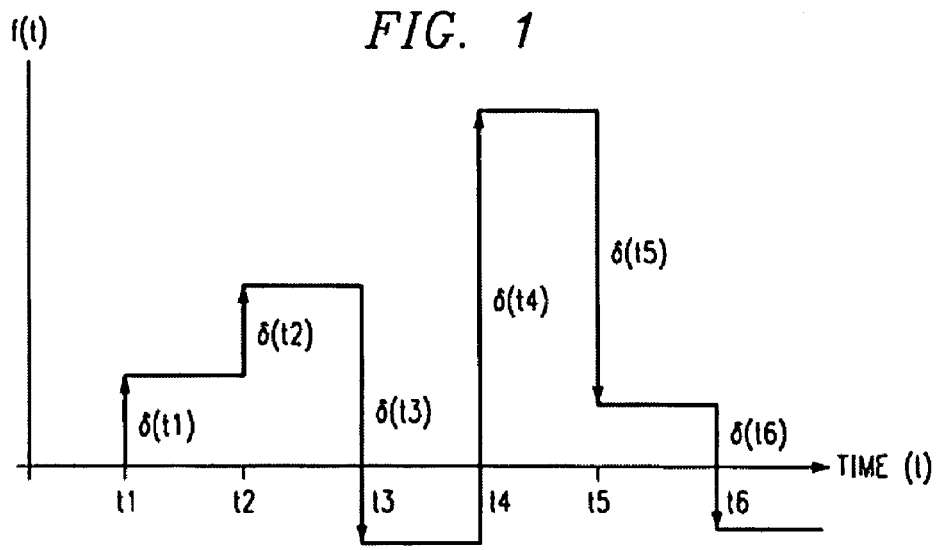
FIG. 1 is an example of a time-varying function, to be represented with a binary tree data structure in accordance with the invention.

FIG. 1 illustrates a time varying function, f(t), which is to be represented as a data structure in accordance with the invention. The function can be expressed as a set, S, of ordered pairs, $S=(X_i, \delta(X_i))=\{(t_1, \delta(t_1)), (t_2, \delta(t_2)), \ldots (t_n, \delta(t_n))\}$, such that the value of f(t) at any time T is $f(T)=\delta(X_1)+\delta(X_2)+ \ldots +\delta(X_n)$ with $n \leq t$. A function represented in this manner is sometimes referred to as a "fluent" function.

Expressed less formally, f(t) can be expressed as a sequence of delta ($\delta$) values in increasing order of time. It is assumed that the initial value of F(t) is 0. It is further assumed that the values of t and $\delta$ are real values. The value of f(t) at a particular time, T, is computed by adding all the delta values that come before that time.

In practical application, f(t) might be an amount of inventory. Over time, the amount of inventory changes, giving rise to delta values, as inventory is shipped out and replenished. Throughout the operation of an ongoing enterprise, new deltas (plus or minus) are continually being added to the function. Meanwhile, queries about the amount of inventory are being made. As illustrated by the examples in the Background, there might be a need to know f(t) at a specified time t or a need to know a time at which at least a specified value of f(t) will be available, i.e., an amount $\geq Y$.

Figure 2:
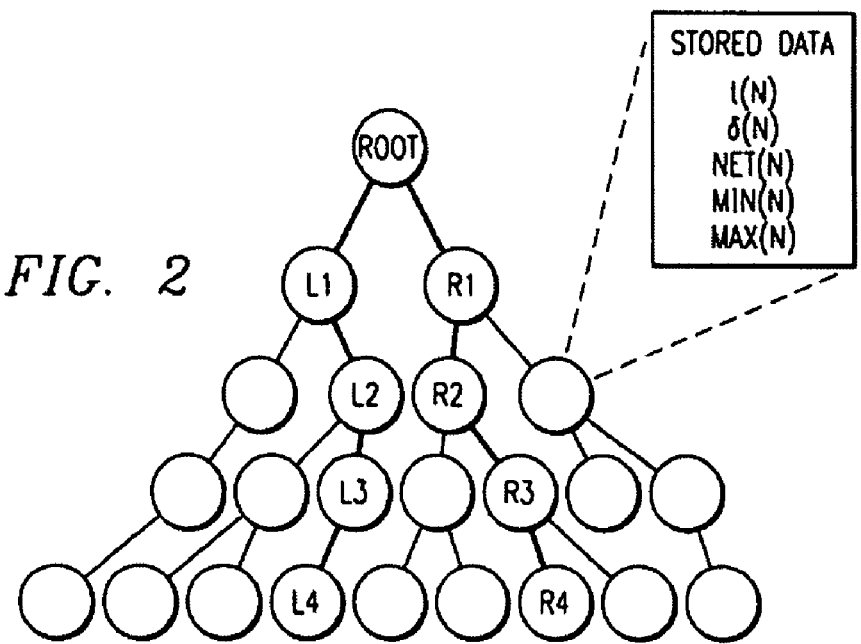
FIG. 2 illustrates the binary tree structure, as well as the delta values stored at each node and other data that can also be stored.

FIG. 2 illustrates the binary tree structure of the present invention, as well as the data stored at each node and the functions that may be called at a node.

Each node, N, stores the following values: t(N), $\delta$(N), Net(N), Min(N), and Max(N). Each node of the tree corresponds to a member of the set of ordered pairs described above in connection with FIG. 1. Thus, at any node, the stored values t and $\delta$ are an ordered pair associated with f(t). The stored data are used during traversal of the tree to solve queries to the tree.

The tree is balanced, in that the root node divides the members of f(t) in half. In other words, half the members of f(t) are to the left of R and half are to the right (within a margin of one to cover the case of an even number of nodes). Thus, for example, if f(t) has n+1 members, n/2 members are to the left of the root node and n/2 members are to the right of the root node. As new deltas occur and f(t) acquires new members, new nodes are added. The tree is re-balanced when appropriate, which causes the values stored in the root node to change. A special case is when the new node has a value of t that is the same as an existing node, in which case the values stored in the node are updated.

Each node has an associated time span that is determined by its position in the tree. The root of the tree, at node R, corresponds to the entire time span of f(t), i.e., the "root time span", which is from $-\infty$ to $+\infty$. Thus, for the root node, $-\infty>t<+\infty$. The root node partitions this time span into two parts, one associated with the subtree to the left of R and one associated with the subtree to the right of R. Likewise, each node under the root node partitions its associated time span into two parts. Thus, going down the tree, the nodes' subtrees represent smaller subdivisions of the root time span. Leaf nodes, such as nodes L4 and R4, have no subtree.

As stated above, each node N stores the following associated values:
t(N)=time at which a delta occurs
δ(N)=value of delta at t
Net(N)=sum of deltas in the subtree
Max(N)=maximum cumulative change in the subtree
Min(N)=minimum cumulative change in the subtree
The latter three values are calculated from values of members of node N's subtree.

Net(N), defined above as the sum of deltas in the subtree (which includes the delta of the node itself), can be calculated as the difference between the function value immediately after the last delta in the subtree and the function value immediately before the first delta. In other words, the net value is determined from a "start value", S(N), and "end value", E(N), associated with the subtree of any node, N. The "start value" for a node is the value of f(t) immediately before the earliest (left-most) delta in the node's subtree. The "end value" is the value immediately after the last (right most) delta in the node's subtree. The end value is also the start value plus the net value, or E(N)=S(N)+Net(N).

For the root node, the start value is zero, or S(N)=0. At all times after the last delta, the value of f(t) is the net value of the root, Net(R). This is because at the root, the end value is the same as the last value and the start value is zero. For a leaf node, the net value is the same as the delta value, or Net(N)=δ(N).

The start value and end values, S(N) and E(N), are not stored. However, as the tree is traversed from the root node to a leaf node, S(N) can be calculated at each node. If N is a parent node, and L and R are its left and right children, then S(L)=S(N) because they have the same leftmost delta. The value of S(R) can be can determined from known and stored values: S(R)=S(N)+Net(L)+δ(N).

Min(N) is the lowest function value relative to S(N) achieved at any point in the node's subtree. In other words, the lowest function value reached in the time interval associated with a node N is S(N)+Min(N). Min(N) does not represent a "weak" lower bound—the value of f(t) is guaranteed to reach S(N)+Min(N) in the time interval. Max(N) is like Min(N), except that it is the highest function value relative to S(N).

If the node is a leaf node, Min(N) is the minimum of zero and δ(N). This is because if δ(N) is positive, the lowest value is S(N), which is the value before t(N). Similarly, for a leaf node, Max(N) is the maximum of zero and δ(N).

For any non-leaf node N, with left and right children L and R:

Net(*N*)=Net(*L*)+Net(*R*)+δ(*N*)

Min(*N*)=minimum of Min(*L*) and (Net(*L*)+δ(*N*)+Min(*R*))

Max(*N*)=maximum of Max(*L*) and (Net(*L*).+δ(*N*)+Max(*R*))

The calculation of Min(N) can be explained as follows. As stated above, S(N)=S(L) and S(R)=S(L)+Net(L)+δ(N).

Because Min(R) is relative to S(R) but Min(N) is relative to S(N), it is adjusted by S(R)−S(N) to determine whether the minimum value reached under R is the minimum value reached under N. S(R)−S(N)=Net(L)+δ(N). Thus, the calculation of Min(N) considers the minimum value reached under each child's subtree, with the right-hand subtree minimum adjusted for the difference in start values.

As is evident from the above discussion, the data stored in a node is local to that node's subtree. The data does not depend on values before or after the time interval associated with the subtree. Each node stores at least one "subtree value" (Net(N), Min(N), or Max(N)), each of which represents a relative contribution of the subtree to a function value.

As explained below, when the tree is traversed for solving a query, these subtree values are used to calculate absolute values from which function values are determined. More specifically, the Net(N) subtree value is the basis for calculating the function value at that node. The Min(N) and Max (N) subtree values are the basis for calculating maximum and minimum bounds of function values within the subtree.

Operations on Binary Tree with Delta Nodes

An Insert Delta operation is used to insert a new delta. For example, suppose a delta at time t with value δ(t) is to be inserted. The tree is traversed downwardly, looking for the leaf node under which the node must be inserted in order to preserve the time-ordering relation in the tree. The new node is inserted it as a leaf node under the previous leaf node. Because this new node is a leaf node, its Net, Min, and Max can be calculated. Then, the "update" operation is performed. This operation can be performed in time O(log n) in a height-balanced tree with n delta nodes.

A Change Delta operation is similar to the Insert Delta operation. The tree is traversed downwardly from the root node until arriving at the node to be changed. Its value is changed, and an Update Delta operation is performed. This operation is also performed in time O(log n) with n delta nodes inserted in a height-balanced tree.

An Update Delta operation deals with the effect of a change in the delta of a node. First, the time of the changed delta is tested against the root node. If the changed delta is to the left (in the left sub-tree), then the descendent nodes to the right of the root node do not need to be changed. This is because the stored values for each node are local to each tree branch. As the only branch that was changed was the left one, the right branch and all the corresponding nodes remain unchanged. The same applies if the node being changed is located in the right sub-tree.

The root node itself will have its Net, Min, and Max values updated. Going down the tree, the visited nodes are marked until the node being changed is reached. These are the only nodes that need to be updated, because they correspond to time intervals containing the node being updated. This operation can be performed in time O(log n) in a height-balanced tree with n delta nodes.

Figure 3:
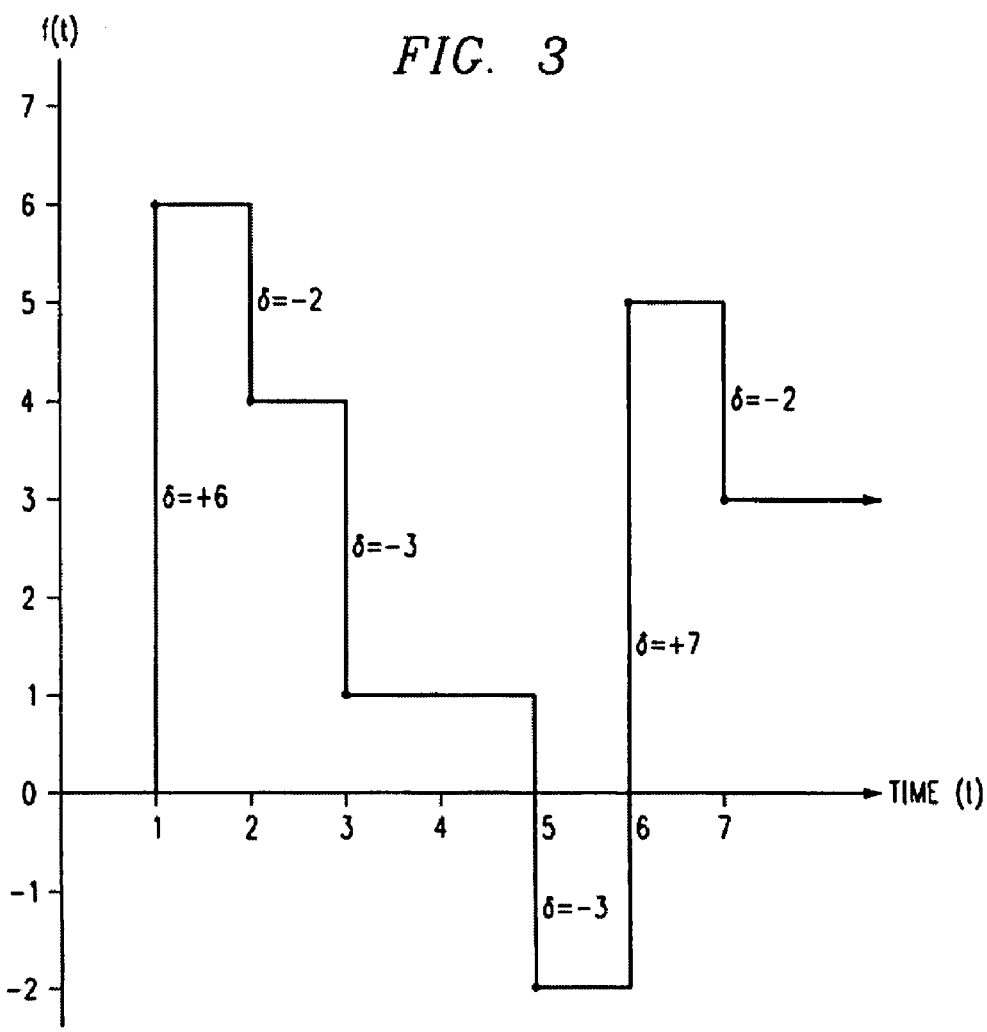
FIG. 3 illustrates an example of a particular time-varying function.
Figure 4:
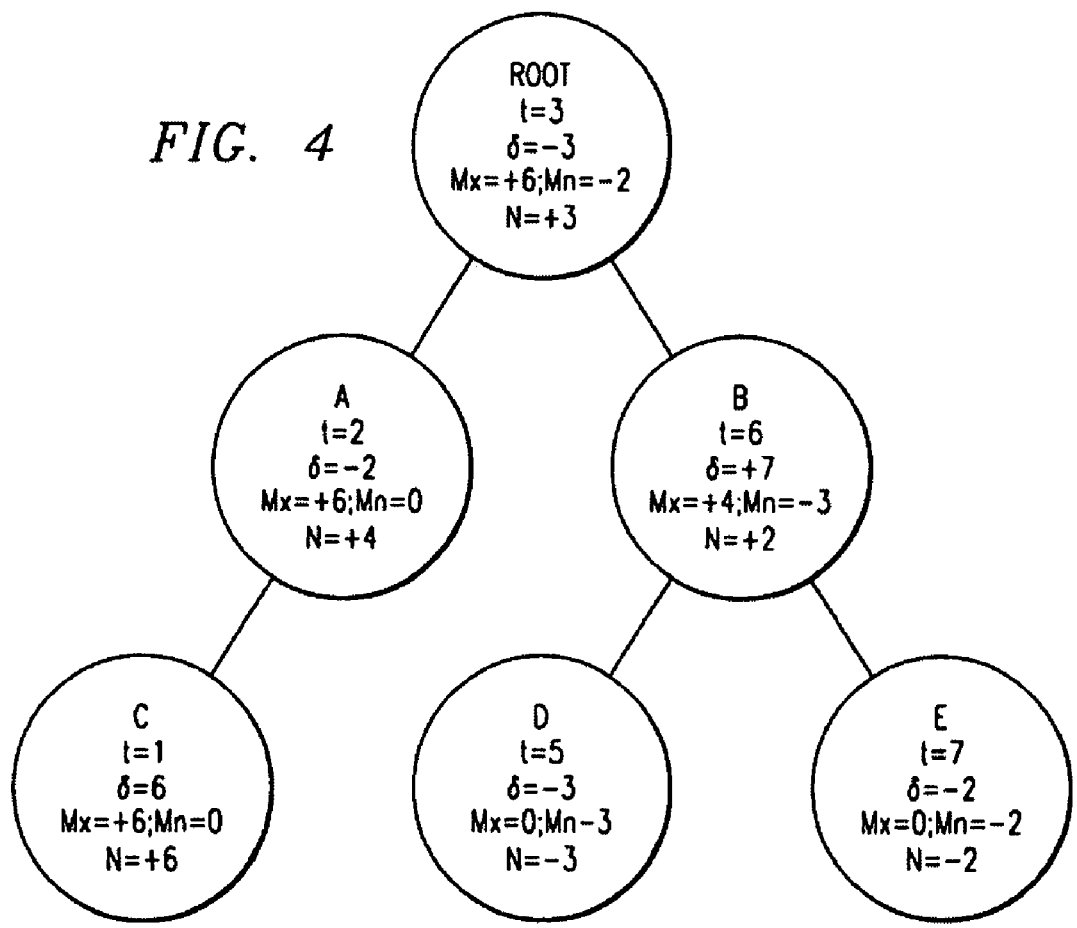
FIG. 4 illustrates a binary tree representing the function of FIG. 3.

A Calculate Function Value operation, explained by example in connection with FIGS. 3 and 4, returns the function value at a given time point. The tree is traversed to the node, N, immediately before the time in question. The function value is S(N)−Net(L)+δ(N), where L is the left child of N. The complexity is O(log n) with n nodes in a height-balanced tree.

Various Find operations include Find Earliest, Find latest, Find Maximum, and Find Minimum.

The Find Earliest operation, explained by example in connection with FIGS. 3 and 4, returns the earliest time, t, when the function value is less, less or equal, greater, greater or equal than a specified value, y. At each node, its left child is visited first, then the right child, thus the nodes with earlier times are visited first. At each node, this operation makes use of the Max and Min values and the bounding box explained above. Because the bounding box sometimes provides a "maybe" rather than a certainty, both the left and right nodes must sometimes be searched. Nevertheless, the search complexity is O(log n) in a height-balanced tree with n nodes.

A Find Latest operation is similar to the Find Earliest operation, with the difference that right children are visited first, because the query is for the latest time point that satisfies the search criteria. The search complexity is the same.

The Find Maximum and Find Minimum operations find the maximum or minimum function value over a specified time interval. Like the other Find operations, these operations use the Max and Min fields at each node and can be performed in O(log n) time.

Example of f(t) with Delta Nodes

FIG. 3 illustrates an example of a function, f(t), defined by six pairs of (t, δt) values. Each t value has a corresponding δ value and a corresponding function value (after δ). Prior to the first δ value at t=1, the function value is zero, or f(t)=0. Thus, the function value is zero from negative infinity to t=1. After the last δ, the function holds the final value, thus f(t)=3 from t=7 to positive infinity. At any particular time, t, there is a function value just prior to t and a function value just after. There may or may not be a δ at any given time point—the deltas may remain constant during some time increments.

FIG. 4 illustrates a binary tree built from the function of FIG. 3. Each node is illustrated with its stored node values, t(N), δ(N), Net(N), Min(N), and Max(N). For purposes of explanation, S(N), a calculated start value associated with the node's subtree, is also shown.

To perform the Calculate Function Value operation, the function value f(t) any time is calculated from the stored values, Net and δ, and the calculated start value, S. To find the function value at time, t, the node, N, is found with the time closest to but not greater than t. As the tree is descended to the time in question, S(N) is calculated at each node. The function value at t is expressed as: $f(t)=S(N)+Net(L)+\delta(N)$, where L is the left child of N. If N has no left child, then Net(L) is defined to be zero.

Referring to the example of FIGS. 3 and 4, to find the function value at t=6, the tree is traversed to node B, calculating S(N) for each visited node. Starting at the root node, by definition S(Root)=0. Descending to node B, because B is a right child of the root node, $S(B)=S(Root)+Net(A)+\delta(Root)$ as explained above in connection with FIG. 2. By substitution, $S(B)=0+4+(-3)=1$. Expressed less formally, S(B) is the function value prior to the subtree under B, i.e., the function value just before node B at t=5. For the function value at node B, t=6, thus $f(t=6)=S(B)+Net(D)+\delta(B)=1+(-3)+7=5$.

For variations of this example, if the tree were to be descended from node B to node D, because D is a left child, then $S(D)=S(B)=1$. To find the function value at t=5.5, the tree would be traversed to node D. At D, $f(t=5.5)=S(D)+0+\delta(D)=1+(-3)=-2$.

The Max and Min values are used to perform the various Find operations. Find operations are directed to finding the earliest/latest time at which f(t) is greater/less than y, or to finding the maximum/minimum value during a specified time interval.

In general, the Max and Min values permit earliest/latest queries to handle $<, >, \leq,$ and $\geq$ predicates. The key to doing this efficiently is that at every node, there is a "bounding box" defined by the time interval covered by the node's subtree and by the minimum and maximum function values that occur within that node (relative to the start value for the node). If the start value of a node N is S(N), then somewhere within the time interval for the node, there is a maximum value of S(N)+Max(N) and a minimum value of S(N)+Min(N). (The maximum or minimum might be S(N) itself.) As the tree is traversed from the root toward the leaves, S(N) for each node is calculated as well as the minimum and maximum function values reached within that node's subtree.

The bounding box often guarantees whether a time satisfying the find query is or is not within a subtree. However, in some cases, the bounding box can provide only a "maybe". Using the example of FIGS. 3 and 4, a "maybe" situation would occur when the query is "find a time greater than t=4 when f(t)>2". At the root node, its bounding box indicates that the function value reaches 2 sometime between t=0 and t=7, but does not indicate whether this occurs before or after t>4. However, a feature of the invention is the likelihood that a node's bounding box will indicate either "yes" or "no" that the solution is in that node's subtree.

Referring to the example of FIGS. 3 and 4, a Find query might ask for the earliest time after t=4 at which the function value is >2. The bounding box for the root node includes times from t=1 to t=7, and function values from a minimum of −2 to a maximum of +6. (If the query were for the earliest time at which the function value is>10, the query would end, because the solution is outside the bounding box.) Because t=4 is greater than t(Root)=3, the solution is in the right subtree. At node B, the bounding box includes times from t=5 to t=7. The start value for the subtree at B, S(B), is calculated to be 1, so the function values for the bounding box at B have a lower bound of −2 and an upper bound of 5. (S(N)+Min and Max, respectively). Somewhere within the bounding box there is a t>4 where the function value is greater than 2. The search continues in this fashion, working down the tree, checking the bounding boxes at each point.

Typically, both the Min and Max fields will be stored so that both "earliest" and "latest" find queries can be solved. However, the invention would be useful with only one of these queries available. In this case, as the tree is traversed, only one bound of the function values within the subtree would be calculated.

Query System for Using the Binary Tree

Figures 5, 6:
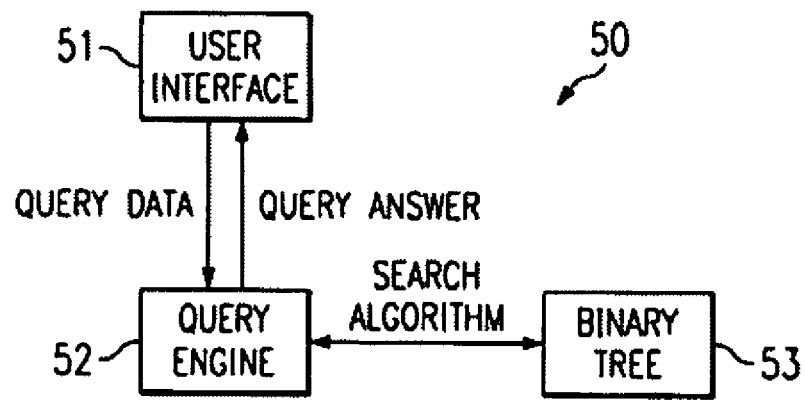
FIG. 5 illustrates a simple query system that uses the binary tree of the present invention.
FIG. 6 illustrates an example of an inventory flow with consumers, producers, on-hand delta values, and inventory requirements delta values.

FIG. 5 illustrates a simple query system 50 for using a binary tree having the above-described structure. As indicated above, the system 50 may be part of a comprehensive model and query system used for scheduling and/or planning. For example, system 50 might be part of a supply chain planning system.

The various elements of system 50 are implemented on a computer, using known processing, memory, and I/O devices.

A user inputs a query, such as one of the various queries described above, via a user interface 51. The query is provided to a query engine 52, which stores and executes various algorithms that accomplish tree searching and related calculations. During operation, engine 52 accesses the appropriate binary tree 52, stored in memory. Binary tree 53 may be part of a larger model, such as the model 12 described above.

Use of Binary Tree to Detect Inventory Problems

One application of the above-described binary tree structure is for detection of inventory problems. As explained below, either of two time-varying functions may be used to represent inventory. A first function is used for "on-hand" queries. A second function is used for "safety stock" queries.

Inventory may be modeled as a "buffer", which is part of model 12. A buffer may be generally described as an object that models the management of the flow of material in the supply chain. The items managed by a buffer are assumed to be interchangable.

Items flow in and out of a buffer. Input flows are referred to as "producers", whereas output flows are referred to as "consumers". The buffer can have associated processes to generate consumers and producers, and to provide buffer specification data, such as safety stocks, safety times, lot sizing, and timing. Referring again to FIG. 5, system 50 might be used to implement the buffer.

On-Hand Inventory

For representing on-hand inventory, a function, f(t), represents current inventory, that is, the quantity "on-hand" in the inventory buffer. This "on-hand" function is represented with the above-described binary tree structure. Each delta value represents a change in inventory quantity, i.e., production or consumption at a time t.

Consumption of material is represented by a negative delta node. Production of material is represented by a positive delta node. These nodes may be referred to herein as consumer nodes and producer nodes respectively.

Updating the "on-hand" function in response to a change in consumption or production can be done in O(log N) time, where N is the total number of quantity changes.

Negative on-hand detection is performed by searching for times when the on-hand quantity value, f(t), changes sign. This search requires O(P*log N) time, where P is the number of negative-on-hand periods, and N is the number of changes in the on-hand quantity. This is possible because it is possible to search the binary tree for the next time when the quantity-on-hand value changes sign in time proportional to log N. Determining a negative-on-hand period uses two searches, one search to find the start of the negative on-hand period (where the quantity-on-hand falls below zero) and one search to find the end of the negative-on-hand period (where the quantity-on-hand becomes non-negative).

A minimum on-hand violation occurs when inventory falls below a desired minimum quantity, the minimum-on-hand quantity. The minimum-on-hand quantity may change with time. The minimum-on-hand quantity can be represented as a step function, which changes value only at a finite number of times. Use of the binary tree permits minimum-on-hand violations to be detected in time proportional to (P+K)*log N, where P is the number of minimum-on-hand violations, K is the number of changes in the minimum-on-hand quantity, and N is the number of changes in the buffer (on-hand) quantity.

An excess-on-hand violation occurs when inventory exceeds a desired maximum quantity. These violations are detected by searching for times when the on-hand quantity crosses a specified maximum-on-hand quantity. Like minimum-on-hand searches, this search requires O((P+K) *log N) time.

Inventory Build-Ahead Requirements

A second function, m(t), may be used to represent inventory build-ahead inventory requirements. These requirements determine build-ahead times for expected deliveries. A binary tree representing this function can be used to detect violations of these requirements.

Build-ahead requirements can be in terms of minimum times. For example, if a delivery is to be made on a Friday, a build-ahead requirement could be to have the inventory available the preceding Monday. Thus, the minimum build-ahead time is 5 days in advance of delivery. A typical goal of a minimum build-ahead time (referred to herein as a "min-time") is to ensure that delivery will occur despite unforeseen interruptions. A min-time violation occurs whenever the material on-hand is not sufficient to cover consumption for the minimum build-ahead time.

Build-ahead requirements can also be in terms of maximum times. A maximum build-ahead requirement might specify that the inventory should not be produced more than 10 days in advance of delivery. A typical application of such a policy might be the pharmaceuticals industry, where products have a limited shelf life. A maximum build-ahead ("max-time") violation occurs whenever material is not consumed within a specified "max-time" after its production.

The build-ahead time can vary over time. For example, a different build-ahead policy might be implemented during certain months, such as the month before Christmas. Expressed mathematically, a function M(t) represents the build-ahead at time t. The function may be a step function, and can be described by a set of ordered pairs <t(i), m(i)>, where M(t)=m(i) when t(i)<=t<t(i+1).

A build-ahead safety-stock quantity, S(t), is the sum of all consumers at times between t and t+M(t). A min-time violation occurs when the quantity on-hand, Q(t), is less than S(t).

A binary tree representing build-ahead requirements is constructed with producer nodes and consumer nodes in a manner similar to the on-hand tree described above. As with the on-hand tree, these nodes are delta nodes and traversal of the tree involves using nodes to compute the value of a time-varying function. A binary tree for the detection of min-time violations is constructed so that its value, F(t), is equal to the difference between the on-hand quantity and the build-ahead safety stock quantity, that is:

$$F(t)=Q(t)-S(t)$$

As with the on-hand tree, each node is a delta node. Traversal of the tree involves using nodes to compute F(t). A min-time violation occurs when F(t) is less than zero.

To construct the inventory requirements tree, producer nodes are created in the same manner as for the on-hand inventory tree. Thus, for each producer at time t for quantity q, a delta is inserted at time t for quantity q. However, multiple delta nodes may be required for a consumer. In the simple case, where the min-time is a constant M, it is sufficient to merely shift each consumer backward in time by M. For a consumer of quantity q at time t, a delta node is created at time t−M with delta −q. However, if the min-time varies, introduction of a new consumer calls for multiple delta nodes to be created (or updated) as follows: for each i where t(i)<=t<t(i+1)+m(i), a −q delta node is inserted at time max(t(i), t−m(i)). If t>t(i+1), then a +q delta node is inserted a time t(i+1).

The time shifting for consumer nodes can be a "min-time" shift or a "max-time" shift, depending on whether the tree is to represent minimum build-ahead ("min-time") requirements or maximum build-ahead ("max-time") requirements. Because the binary tree for both types of requirements is constructed in the same manner, the time shift is referred to herein collectively as an "m-time" shift. If the build-ahead requirement is a max-time, the m-shift is longer than it would be for a min-time.

Using the inventory requirements tree, where the m-times are min-times, for each consuming flow at time t, there will be a min-time period i where t(i)<=t<t(i+1). This means that the net change to the function for a consuming flow of quantity q will be −q. The function value is the difference between the on-hand quantity at time t and the min-time inventory requirement at time t. If the function value is negative, there is a min-time violation.

When the m-time is constant, for each consumer of quantity q at time t, a consumer node is constructed as a −q node at an m-shifted time, t−m. However, when the m-time varies, each consumer may require multiple −q nodes as well as +q nodes at specially calculated times. Thus, as explained below by example, for each i where $t(i)<=t<t(i+1)+m(i)$, a −q node is inserted at time $\max(t(i), t-m(i))$. If $t>t(i+1)$, a +q node is inserted at time $t(i+1)$.

In general, construction of the tree requires $O((C*M+S)*\log N)$ time, where C is the number of consuming flows, M is the average number of m-time intervals affected by each consumer, and S is the number of producing flows. However, if the m-time is constant, construction of the tree requires only $O(N \log N)$ time.

Thus, the inventory requirements tree may be used to detect "min-time" violations. These violations are detected by searching for times when the function value changes sign.

To detect max-time violations, a binary tree is constructed in the same manner as construction of the min-time tree. A max-time violation occurs whenever the function value is positive.

If an enterprise has both a min-time and max-time policy, two trees are constructed. A first tree is shifted by min-time(s) and a second tree is shifted by max-time(s). These trees are then used to detect min-time and max-time violations, respectively.

For both types of m-time violations (min-time and max-time, the detection time is $O(P*\log N)$, where P is the number of min-time violations detected.

Example of Binary Trees for On-Hand Inventory and for Inventory Requirements with Constant M-Time FIG. 6 illustrates an inventory flow over a 9 day time horizon. There are two consumers and two producers.

As stated above, both the on-hand inventory tree and the inventory requirements tree have the same producer nodes. To construct either binary tree, for each producer at time t for quantity q, a delta value of q is inserted at time t. For the specific example of FIG. 6, producer nodes are inserted for the following ordered pairs:

| delta | time |
|-------|------|
| 6     | 3    |
| 10    | 8    |

For the on-hand inventory tree, consumer nodes are inserted for each consumer of quantity −q at time t as follows:

| delta | time |
|-------|------|
| −5    | 6    |
| −7    | 9    |

The inventory quantity on-hand, f(t), at any time t results from summing consumer deltas and producer deltas up to time t.

The m-time is a consideration in construction of the inventory requirements tree. In the example of FIG. 6, the min-time is a constant value of 4 days, throughout the 9 day horizon. Because the min-time is constant, only one delta is inserted for each consumer and these deltas are negative. Thus, for each consumer at time t for quantity q, a delta value of −q is inserted at shifted times, (t−m), as follows:

| δ(i) | t(i)      |
|------|-----------|
| −5   | 6 − 4 = 2 |
| −7   | 9 − 4 = 5 |

In a manner analogous to on-hand quantities, the value of the min-time function, m(t), can be obtained by summing consumer deltas and producer deltas up to time t. As indicated by the arrows, a min-time violation occurs when the function value is negative.

In effect, traversal of the tree provides function values that are the difference between the on-hand quantity and the quantity that will be consumed m-time ahead. The latter quantity is often referred to as "safety-stock". For example, consider day 5. The quantity on-hand is 6 because of the producer on the 3rd. The consumers on the 6th and 9th result in a min-time safety stock of −12. The difference between the on-hand quantity and the safety stock is (6−12), and this negative difference indicates a min-time violation on day 5. A safety stock quantity at any time t can be obtained by subtracting the values of the two functions, f(t)−m(t).

Example of Binary Tree for Inventory Requirements with Varying M-Times

The following example represents an inventory flow, during which the m-time changes. The inventory flow is over a period of one month, during which there are three different m-times.

As in the above example, a binary tree can be constructed for a function, m(t), that represents inventory requirements for build-ahead times (m-times). Suppose that m-time values change as follows:

| dates     | m-time  |
|-----------|---------|
| 1st-10th  | 15 days |
| 11th-20th | 8 days  |
| 21st-31st | 10 days |

These values can be related to the above mathematical description, by representing m(t) as the following set of ordered pairs, t(i), m(i), i=1, 2, 3:

| m(1), t(1) | 15, 1  |
| m(2), t(2) | 8, 11  |
| m(3), t(3) | 10, 21 |

Each pair represents a step in an m-time function, m(t), which looks like the function illustrated in FIG. 1. Expressed mathematically, $m(t)=m(i)$ for $t(i)<=t<t(i+1)$. For example, on t=3 (day 3), t is between t(1) and t(2). Thus, $m(t)=m(i)=15$.

As a result of these min-times, on the 1st, material is needed on-hand to cover consumption between the 1st and the 16th. On the 10th, material is needed to cover consumption between the 10th and the 25th. In other words, from the 1st to the 10th, material is needed to cover consumption on that day plus consumption for the next 15 days. The material needed on a given day may be referred to as the "safety stock" requirement.

Similarly, on the 11th, material is needed to cover consumption between the 11th and 19th. On the 20th we need to cover consumption between the 20th and 28th. On the 21st we need to cover consumption between the 21st and 31st.

When the min-time changes, the effect of the shifted consumer must be accommodated. For example, because the min-time decreases from 15 to 8 days, consumption on the 22nd affects the safety stock requirement from the 7th (22−15) through the 10th, and also from the 14th (22−8) through the 22nd, but does not affect the safety stock requirement on the 11th through 13th.

To express this symbolically, suppose that the min-time value from day B to day E is M days. This is another way of expressing an m-time between t(i) and t(i+1). A consumer on day D (time t) will affect safety stock in the period from B to E if D is on or after B, but D−M is on or before E; that is, if B<=D and D−M<=E. Expressed mathematically, the consumer has an effect for each i where t(i)<=t<t(i+1)+m(i).

Continuing the example, to model consumption of 9 units on the 22nd, the following consumer nodes would be created in the min-time binary tree:

| date | delta | comment |
|------|-------|---------|
| 7th  | −9    | consumption advanced 15 days |
| 11th | +9    | end of period with min-time of 15 days; effect of a shifted consumer is canceled when min-time changes |
| 14th | −9    | consumption advanced 8 days |
| 21st | +9    | end of period with min-time of 8 days |
| 21st | −9    | start of period with min-time of 10 days |

For the given consumer, t=22 and q=9. As stated above, a −q is inserted for each i where t(i)<=t<t(1+1)+m(i). For example, for i=1, t(i)=1, m(i)=15, and t(i+1)=11. The condition is met: 1<=22<26. The −q value for i=1 is inserted at max(t(i), t−m(i))=max(1, 22−15)=max(1, 7)=7. This process is repeated for i=2 and i=3.

The +q values are inserted where t>t(i+1). For example, for i=1, 22>11. Because this condition is met, a +9 value is inserted at t(i+1), i.e., on the 11th. This +q cancels the effect of the −q inserted on the 7th. For i=2, 22>21, and a +9 value is inserted on the 21st, to cancel the effect of the −q inserted on the 14th. For i=3, t(i+1) is assumed to be some time in a future of no interest, and no +q value is inserted.

Additional Inventory Queries

A safety stock quantity may be defined as the maximum of the minimum-on-hand quantity and the min-time safety stock. A low-on-hand problem can be reported whenever the on-hand quantity falls below the safety stock quantity. This requires separately detecting minimum-on-hand violation and min-time violations, then combining adjacent violations to produce the low-on-hand times.

Maximum-on-hand quantity can be defined as the sum of the safety stock quantity and the excess-on-hand quantity. Detection of excess-on-hand problems is performed by separately detecting periods where the on-hand quantity is greater than the sum of the minimum-on-hand quantity and the excess-on-hand quantity, and periods where the on-hand quantity is greater than the sum of the min-time quantity and the excess-on-hand quantity. This yields two subsets of the timeline.

Excess-on-hand over the periods formed by intersecting these subsets can be reported.

Other Embodiments

Although the present invention has been described in detail, it should be understood that various changes, substitutions, and alterations can be made hereto without departing from the spirit and scope of the invention as defined by the appended claims.

What is claimed is:

1. A system providing inventory requirements data, relative to on-hand inventory having a build-ahead time, comprising:
   a computer-readable memory storing a balanced binary tree representing inventory values in terms of a time varying function that is a series of time value and function value pairs, the balanced binary tree comprising a plurality of nodes, at least one of the nodes associated with a time span defined by a position of the node in the balanced binary tree;
   wherein each node of the tree has an associated time value and delta value representing a change in value of the time varying function, and each node stores either a producer delta or a consumer delta, with each producer delta having a positive value and each consumer delta having a negative value; and
   an engine for accessing the tree, the engine using delta values to determine at least one function value representing inventory quantity at a certain time.

2. The system of claim 1, further comprising a user interface delivering query data to the engine, and providing data output derived from the function value, in response to the query.

3. The system of claim 1, wherein the time values of consumer deltas are shifted in accordance with the build-ahead time.

4. The system of claim 3, wherein the build-ahead time is a minimum build-ahead time and the engine determines when the function value is negative.

5. The system of claim 3, wherein the build-ahead time is a maximum build-ahead time, and the engine determines when the function value is positive.

6. The system of claim 1 wherein each node further stores a net subtree value representing the sum of deltas in a net subtree associated with the node.

7. The system of claim 1, wherein the function is a step function.

8. The system of claim 1, wherein each node stores a constant delta value.

9. The system of claim 1, wherein the engine searches the tree to locate a time value when the function value changes to a negative value.

10. The system of claim 1, wherein the engine searches the tree to locate a time value when the function value drops below a specified minimum on-hand value.

11. The system of claim 1, wherein the engine searches the tree to locate a time value when the function value changes to a specified maximum on-hand value.

12. The system of claim 1, further comprising outputting by the computer, data representing the function value.

* * * * *